United States Patent [19]

Sieger et al.

[11] Patent Number: 4,565,883

[45] Date of Patent: Jan. 21, 1986

[54] CYANOACRYLATE ADHESIVE COMPOSITION

[75] Inventors: Heinz Sieger, Eppelheim; Heinz Tomaschek, Heidelberg, both of Fed. Rep. of Germany

[73] Assignee: Teroson GmbH, Fed. Rep. of Germany

[21] Appl. No.: 540,725

[22] Filed: Oct. 11, 1983

[30] Foreign Application Priority Data

Oct. 27, 1982 [DE] Fed. Rep. of Germany ....... 3239776

[51] Int. Cl.$^4$ .................. C07D 307/12; C07C 121/30; C07C 121/46; C07C 121/70
[52] U.S. Cl. .............................. 549/475; 260/465 D; 260/464; 260/465.4
[58] Field of Search ................ 260/465.4, 464, 465 D; 549/475

[56] References Cited

U.S. PATENT DOCUMENTS

| | | | |
|---|---|---|---|
| 2,756,251 | 7/1956 | Joyner et al. | 260/465.4 |
| 2,765,332 | 10/1956 | Coover, Jr. et al. | 260/464 |
| 2,794,788 | 6/1957 | Coover, Jr. et al. | 260/17 |
| 2,912,454 | 11/1959 | McKeever | 260/465.4 |
| 2,926,188 | 2/1960 | McKeever et al. | 260/465.4 |
| 3,576,877 | 4/1971 | Albert et al. | 260/455 X |
| 3,632,564 | 1/1972 | Albert et al. | 260/94.7 N |
| 3,652,635 | 3/1972 | Kawamura et al. | 260/464 |
| 3,728,375 | 4/1973 | Coover, Jr. et al. | 260/465.4 |
| 3,742,018 | 6/1973 | O'Sullivan | 260/465.4 |
| 3,993,678 | 11/1976 | Sweeny et al. | 260/465 D |
| 4,041,063 | 8/1977 | Buck | 260/465.4 |
| 4,171,416 | 10/1979 | Motegi et al. | 526/298 X |

FOREIGN PATENT DOCUMENTS 914693 11/1972 Canada .
2118701 10/1972 Fed. Rep. of Germany .
2128985 1/1973 Fed. Rep. of Germany .
1392763 4/1975 United Kingdom .
1392400 4/1975 United Kingdom .

*Primary Examiner*—Joseph Paul Brust
*Attorney, Agent, or Firm*—Philip M. Pippenger; William W. McDowell, Jr.

[57] ABSTRACT

Adhesive composition consisting of α-cyanoacrylate, one or more sulphonic acid derivatives as stabilizers and conventional additives. The stabilizers are sulphonic acid derivatives having the general formula

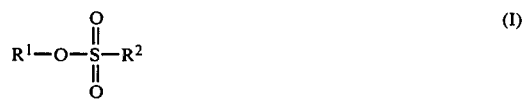

(I)

in which $R^1$ is a trimethylsilyl group, $R^2$ a halogen atom, an alkyl group, a perfluoroalkyl group, a cycloalkyl group or an aryl group or $R^1$ and $R^2$ together, accompanied by cyclization, represent a group of the general formula

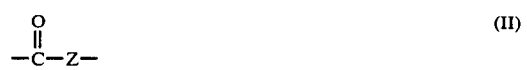

(II)

in which Z is a substituted or unsubstituted phenylene radical. Preferred are combinations of compounds in which in one $R^1$ is a trimethylsilyl group and in the other $R^1$ and $R^2$ form the aforementioned ring group. (Dihydroxy)-organylboranes and bis(dihydroxyboryl)-derivatives can be used as costabilizers. The storage stability obtained with the stabilizers according to the invention is excellent, without impairing the setting rate and the strength of the bonds obtained.

9 Claims, 1 Drawing Figure

CYANOACRYLATE ADHESIVE COMPOSITION

BACKGROUND OF INVENTION

The present invention relates to a α-cyanoacrylate-based adhesive composition having good storage stability.

α-cyanoacrylates of general formula

are rapid-setting adhesives which are suited for an extraordinarily rapid adhesion of a large number of materials like rubber, plastics, metal, leather and wood in various technical areas like machine construction, apparatus construction, electrical engineering, jewelery industry, watch-maker industry, household etc. The parts can be joined in an extremely short time of only a few seconds and the adhesive joints produced in this way have good mechanical strengths characteristics. These adhesive harden by anionic polymerization initiated by even small traces of extremely weak basic-acting compounds (Lewis bases) such as for example, water or methanol. Due to the extreme reactivity of these adhesives usually inhibition of premature polymerization which has an adverse effect on storage stability is required. Accordingly, in the past acidic gases like sulphur dioxide, nitrogen monoxide, carbon dioxide, hydrogen fluoride etc., have been added to these adhesives. Furthermore, proton acids including mineral acids like hydrochloric acid, sulphuric acid and polyphosphoric acid, anhydrides like phosphoric anhydride, sulfonic acids and carboxylic acids like acetic acid, itaconic acid and benzenesulfonic acid have been used as stabilizers. Typical patents relating to the aforementioned stabilizers are U.S. Pat. No. 2,765,332, U.S. Pat. No. 2,794,788, U.S. Pat. No. 2,756,251, U.S. Pat. No. 2,912,454, U.S. Pat. No. 2,926,188, U.S. Pat. No. 3,728,375, U.S. Pat. No. 3,993,678 and DE-OS No. 23 07 834. Reference is also made to U.S. Pat. No. 3,652,635, DE-OS No. 21 28 985, DE-OS No. 20 42 334, DE-OS No. 18 07 895 and DE-OS No. 21 18 701, which propose organic sulfonic acids, sulfonic anhydrides, aliphatic or aromatic sultons and aliphatic sulfocarboxylic anhydrides as stabilizers for α-cyanoacrylate-based adhesives.

However, gaseous stabilizers are only suited to a limited degree for effective stabilization of α-cyanoacrylates, since metering in the liquid adhesive is difficult and during storage undefined amounts can prematurely escape. When using higher concentrations of acidic gases or non-gaseous acids the curing rate of the α-cyanoacrylates rapidly decreases. On the other hand when using too low concentrations no sufficient stabilization is achieved.

It has now been surprisingly found that the above difficulties and disadvantages of the prior art stabilizers can be avoided or the stabilizing action can be improved by using as stabilizers certain sulfonic acid derivatives and preferably combinations of such sulfonic acid derivatives. It has also surprisingly been found that storage stability can frequently be still further improved by combining these stabilizers with compounds from the group consisting of (dihydroxy)-organylboranes and bis-(dihydroxyboryl)-derivatives.

DETAILED DESCRIPTION OF INVENTION

Figure 1:
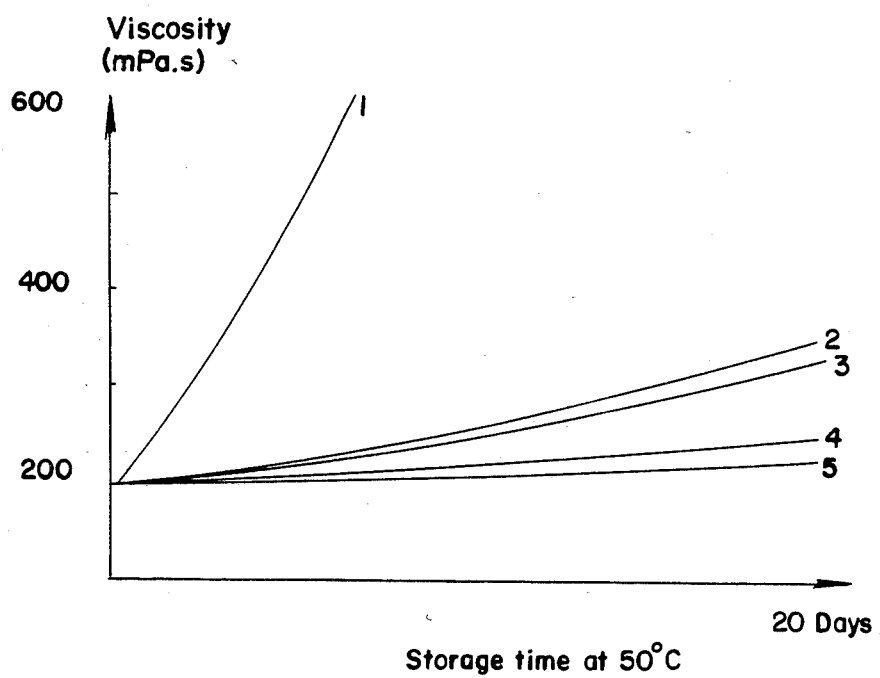

The present invention is directed to adhesive compositions based on α-cyanoacrylate and which contain one or more sulfonic acid derivatives as stabilizer and may contain conventional additives as described herein and in the appended claims. Preferred embodiments, which may additionally contain a costabilizer, are also described herein and in the appended subclaims.

The generally known α-cyanoacrylates which serve as a basis for the adhesive compositions according to the invention are of general formula:

wherein R is a straight or branched-chain alkyl group having 1 to 20 carbon atoms such as methyl, ethyl, n-propyl, isopropyl, n-butyl, isobutyl, pentyl, hexyl and the like as well as a halogen atom substituted alkyl group such as 2-chloroethyl, 3-chloropropyl, 2-chlorobutyl, trifluoroethyl, and the like; a straight or branched-chain alkenyl group, such as allyl, methallyl, crotyl and the like; a straight or branched-chain alkinyl group such as propargyl and the like; a cycloalkyl group such as cyclohexyl and the like; a tetrahydrofurfuryl group; an ether group X-O-Y or X-O-X-O-Y, in which X is a saturated alkylene group having 2 to 4 carbon atoms and Y is an alkyl group having 2 to 6 carbon atoms such as 2-methoxyethyl, 3-methoxybutyl, 2-ethoxyethyl and the like; an aralkyl group such as benzyl or an aryl group such as phenyl, cresyl and the like. Further, German published application DE-OS No. 28 16 836 refers to a large number of suitable α-cyanoacrylates which are incorporated herein by reference.

The subject stabilizers contained in the adhesive compositions according to the invention are sulfonic acid derivatives of general formula

wherein $R^1$ is a trimethyl silyl group $Si(CH_3)_3$, $R^2$ is a halogen atom, a straight or branched-chain alkyl group having 1 to 10 carbon atoms, a perfluoroalkyl group having 1 to 10 carbon atoms, a cycloalkyl group or an aryl group or $R^1$ or $R^2$ together and accompanied by cyclization stand for a group of general formula

in which Z is

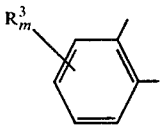

with $R^3$ being an alkyl group with 1 to 4 carbon atoms, an oxyalkyl group with 1 to 7 carbon atoms or a nitro group, m having a value between 0 and 3.

In a preferred embodiment the adhesive compositions according to the invention contain combinations of compounds according to general formula I. Thus, preferably compounds in which $R^1$ stands for a trimethyl silyl group are combined with a compound in which $R^1$ and $R^2$, accompanied by cyclization, form a group of general formula II. When using such combinations of sulfonic acid derivatives, Z can also be $-CR_2^4-CR_2^5$ in the group of general formula II, $R^4$ and $R^5$ being the same or different and stand for hydrogen or alkyl radicals. Like the other sulfonic acid derivatives used according to the invention, the latter can also be combined with (dihydroxy)-organylboranes or bis(dihydroxyboryl)-derivatives of general formula $$R^6[B(OH)_2]_m \qquad (III)$$

wherein m is 1 or 2 $R^6$ is a straight or branched-chain alkyl or alkylene group having 1 to 12 carbon atoms, which can contain halogen atoms, a cyclohexyl or cyclohexylene group, an aralkyl or aralkylene group or an aryl or arylene group. The adhesive compositions containing the sulfonic acid derivatives according to the invention, their combinations or their combinations with compounds of general formula III are characterized by an excellent storage stability, whilst retaining very good setting times and strengths of the bonds.

The compounds which are suitable alone or in combination as stabilizers can, as solid or liquid substances, be predissolved in a simple manner in a specific monomer quantity. By means of the thus obtained stabilizer solution, an α-cyanoacrylate quantity obtained by depolymerization of polycyanoacrylate and subsequent distillative purification can then be stabilized in the desired manner depending on the requisite storage stability and setting time. The resulting adhesive mixtures show an excellent storage stability, accompanied by short setting times on various substrates.

Examples of typical compounds according to general formula I in which $R^1$ stands for a trimethylsilyl group (trimethylsilyl sulfonates) and which are suitable for the purposes of the present invention are inter alia trimethylsilyl methane sulfonate, trimethylsilyl trifluoromethane sulfonate, trimethylsilyl nonafluorobutane sulfonate, trimethylsilyl heptadecane sulfonate, trimethylsilyl benzene sulfonate, trimethylsilyl toluene sulfonate and trimethylsilyl chlorosulfonate.

Stabilizers according to general formula I in which $R^1$ and $R^2$, accompanied by cyclization, form the group with general formula II and which are suitable according to the invention are inter alia 2-sulfobenzoic cycloanhydride, 3,4-dimethyl-2-sulfobenzoic cycloanhydride, 5-methoxy-2-sulfobenzoic cycloanhydride, 5-ethoxy-2-sulfobenzoic cycloanhydride, 5-isopropyloxy-2-sulfobenzoic cycloanhydride and 5-nitro-2-sulfobenzoic cycloanhydride. These compounds can be used as effective inhibitors of anionic polymerization without other additives. However, 3-sulfopropionic cycloanhydride is only used in combination with compounds of general formula I, in which $R^1$ stands for a trimethylsilyl group, and/or with (dihydroxy)-organylboranes or bis(dihydroxyboryl)-derivatives. All these compounds in which $R^1$ and $R^2$ form a ring closure, contain the group

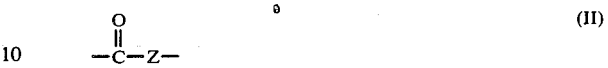

so that the following structural formula is obtained:

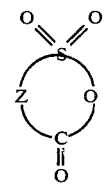

wherein Z has the aforementioned meaning. In other words, they are sulfocarboxylic cycloanhydrides.

Examples of costabilizers from the group of (dihydroxy)-organylboranes suitable according to the invention and which can only be used in combination with sulfonic acid derivatives, are inter alia (dihydroxy)-ethylborane, (dihydroxy)-n-propylborane, (dihydroxy)-trifluoropropylborane, (dihydroxy)-n-butylborane, (dihydroxy)-t-butylborane, (dihydroxy)-n-pentylborane, (dihydroxy)-n-hexylborane, (dihydroxy)-cyclohexylborane, (dihydroxy)-n-dodecylborane, (dihydroxy)-benzylborane, (dihydroxy)-p-tolylborane, (dihydroxy)-o-trifluoromethylphenylborane, (dihydroxy)-o-ethylphenylborane, (dihydroxy)-mesitylborane, (dihydroxy)-p-carboxyphenylborane, (dihydroxy)-o-methoxyphenylborane, (dihydroxy)-o-chlorophenylborane and (dihydroxy)-o-nitrophenylborane. In addition, there are bis(dihydroxyboryl)-derivatives such as bis(1,4-dihydroxyboryl)-benzene and optionally the benzene nucleus can have one or more substituents.

Some examples of stabilizer combinations suitable according to the invention are o-sulfobenzoic cycloanhydride combined with trimethylsilyl benzene sulfonate, 3-sulfopropionic anhydride combined with a trimethylsilyl sulfonate, o-sulfobenzoic cycloanhydride combined with a (dihydroxy)-alkyl or preferably (dihydroxy)-aryl borane, which can be termed as alkyl or aryl boronic acids, 3-sulfopropionic anhydride combined with (dihydroxy)-phenylborane (benzene boric acid) and trimethylsilyl benzene sulfonate combined with a (dihydroxy)-alkyl borane or (dihydroxy)-aryl borane, such as benzene boronic acid.

The stabilizers according to the invention as well as their combination are used in a quantity of 0.0001 to 0.1% by weight and preferably 0.001 to 0.05% by weight, based on the α-cyanoacrylate monomers. A percentage composition of 20 to 80% by weight, preferably 40 to 60% by weight, based on the quantity of the first stabilizer used, has proved advantageous for the stabilizer combinations. The (dihydroxy)-organylboranes and bis(dihydroxyboryl)-derivatives used as costabilizers, based on the weight of the sulfonic acid derivative used, can be used in such a quantity that the weight ratio of costabilizer to stabilizer is 0.5:1 to 10:1.

The stabilizers and costabilizers used according to the invention are either commercially available or are prepared according to known processes.

Trimethylsilyl sulfonates, i.e. compounds of general formula I in which $R^1$ is a trimethylsilyl group, are obtained by heating the sulfonic acids with trimethylchlorosilane or under mild conditions in certain cases by reacting aryl trimethylsilane with the corresponding sulfonic acids (D. Häbich, F. Effenberger, Synthesis, 1978, 755; H. Emde et al, Synthesis, 1982, 1).

Compounds of general formula I, in which $R^1$ and $R^2$, accompanied by cyclization, form the group of formula II, i.e. aromatic cyclic sulfocarboxylic anhydrides can be prepared merely by heating the free acid or accompanied by the addition of phosphorous pentoxide and by treatment with acetyl chloride. According to another process, aromatic carboxylic cycloanhydrides are obtained by reacting ammonium salts of o-sulfocarboxylic acids with thionyl chloride (cf. Organic Synthesis Collective, Vol. 1, 495, (1941)). The cyclic anhydrides of aliphatic sulfocarboxylic acids, i.e. Z is $-CR_2^4-CR_2^5-$, suitable as stabilizers in combination with trimethylsilyl sulfonates and/or (dihydroxy)-organylboranes or bis(dihydroxyboryl)-derivatives can be prepared by photochemical sulfochlorination of the corresponding carboxylic acids with sulfonyl chloride.

Alkyl or aryl boric acids, i.e. (dihydroxy)-organylboranes are generally obtained by reacting trihalogen boranes with Grignard reagents and subsequent hydrolysis. A second generally used method consists of the hydrolysis of the products obtained by photochemical reaction of tribromoboranes and alkyl benzene. Functional groups such as e.g. nitro groups on aromatic (dihydroxy)-organylboranes must be subsequently introduced. The bis(dihydroxyboryl)-derivatives are obtained by hydrolysis of the corresponding organyl-bis(dihaloboranes) or organyl-bis(dialkyloxyboranes) or by reacting tris(alkyloxy)-boranes with difunctional Grignard reagents (Gmelin: Handbuch der Anorganischen Chemie, supplement to 8th edition, Vol. 48, part 16, 167).

Surprisingly, through the combination of the compounds suitable as stabilizers according to the invention with one another or with compounds of general formula III, a significant synergistic stabilizing effect is obtained. Although the reasons for this have not as yet been clarified, it is assumed that the synergistic stabilizing effect is based on the different reactivity features of the stabilizers according to the invention.

As mentioned before the adhesive combinations according to the invention may also contain conventional additives. As α-cyanoacrylates are also capable of radically initiated polymerization, it is advantageous to add to the adhesive compositions according to the invention common inhibitors for the radical polymerization. Such inhibitors are for example quinone, hydroquinone, p-methoxyphenol, pyrogallol, p-tert.-butyl catechol and 2,6-di-tert.-butyl-p-cresol. These inhibitors can be added in a concentration of about 0.001 to 1% by weight based on the total weight of the adhesive composition.

Depending on the intended use, the adhesive compositions according to the invention may contain further conventional additives such as thickeners, plasticizers, polymers, accelerators, perfumes, dyes, pigments, further copolymerizable monomers and solvents. Thus, for example when joining porous materials it is desired to increase the viscosity by adding a thickener to avoid that the adhesive penetrates the pores of the surfaces to be adhered to one another. Furthermore, the setting times of the adhesives according to the invention especially on porous/acidic surfaces (e.g. wood) can be reduced by polymerization catalysts like podands as disclosed in German published applications DE-OS No. 30 25 127 and DE-OS No. 31 09 220 which are herein incorporated by reference. Such modifications are sufficiently described in the literature.

The following examples are given for illustrative purposes only and are not meant to be a limitation on the subject invention except as defined by the claims appended hereto. All parts and percentages are by weight unless otherwise indicated.

EXAMPLE 1

Several stabilizers according to the invention in the quantities stated in Table I were added to freshly distilled ethyl-α-cyanoacrylate containing 0.01% by weight hydroquinone and 30 ppm $SO_2$. The obtained adhesives were tested for their long term stability at room temperature and in an accelerated ageing test at 50° C. As a measure for the stability serves the change of viscosity of the liquid adhesives. The viscosity in mPa.s is determined with a capillary viscosimeter. The results are also given in Table I.

There were only insignificant changes to the good setting times of the adhesives through storage.

Substantially the same results were obtained in tests in which ethyl-α-cyanoacrylate was wholly or partly replaced by methyl-, $C_3-C_{20}$-alkyl, cycloalkyl-, alkoxyalkyl-, alkoxyalkoxyalkyl- and phenyl-α-cyanoacrylate as well as mixtures thereof.

TABLE I

| Stabilizer | | Storage Stability | |
|---|---|---|---|
| Type | Added Amount (ppm) | RT | 50° C. |
| Trimethylsilyl methane sulfonate | 100 | Longer than 6 months | Longer than 20 days |
| Trimethylsilyl benzene sulfonate | 100 | Longer than 6 months | Longer than 20 days |
| Trimethylsilyl p-toluene sulfonate | 100 | Longer than 6 months | Longer than 20 days |
| o-sulfobenzoic cycloanhydride | 100 | Longer than 6 months | Longer than 20 days |
| No additive | — | 10 days | 3 days |

EXAMPLE 2

The stabilizers used in example 1 were replaced by various combinations of stabilizers according to the invention. The obtained adhesives were stored and tested in the same manner as in example 1.

Again there were only negligible changes to the short setting times on various substrates as a result of storage. The results of the storage stability tests are given in Table II.

TABLE II

| Stabilizer Combination | | Storage Stability | |
|---|---|---|---|
| Type | Added Amount (ppm) | RT | 50° C. |
| No additive | — | 10 days | 3 days |

TABLE II-continued

| Stabilizer Combination | | Storage Stability | |
|---|---|---|---|
| Type | Added Amount (ppm) | RT | 50° C. |
| Trimethylsilyl benzene sulfonate | 50 | Longer than 6 Months | Longer than 30 days |
| o-sulfobenzoic cycloanhydride | 50 | | |
| Trimethylsilyl benzene sulfonate | 50 | Longer than 6 Months | Longer than 30 days |
| 3-sulfopropionic anhydride | 50 | | |
| o-sulfobenzoic cycloanhydride | 80 | Longer than 6 Months | Longer than 30 days |
| benzene boromic acid | 400 | | |
| 3-sulfopropionic anhydride | 80 | Longer than 6 Months | Longer than 30 days |
| benzene boromic acid | 400 | | |
| Trimethylsilyl benzene sulfonate | 80 | Longer than 6 Months | Longer than 30 days |
| benzene boromic acid | 500 | | |

EXAMPLE 3

An adhesive mixture, which was stable in storage, was prepared from freshly distilled ethyl-α-cyanoacrylate, containing 0.01% by weight of hydroquinone and 30 ppm SO₂, using several stabilizers and stabilizer combinations according to the invention. The obtained adhesives were thickened with polymethyl methacrylate (PMMA) with a molecular weight distribution of 400,000 to 500,000. Further a polymerization accelerating podand was added to accelerate setting on porous-/acidic surfaces (cf. Table III).

TABLE III

| Stabilizer Type | Added Amount (PPM) | Thickener PMMA (% by weight) | Podand Polyethylene glycol-400-dimethyl ether (% by weight) |
|---|---|---|---|
| 1. No additive | — | 8 | 0.5 |
| 2. Trimethylsilyl benzene sulfonate | 100 | 8 | 0.5 |
| 3. o-sulfobenzoic cycloanhydride | 100 | 8 | 0.5 |
| 4. Trimethylsilyl benzene sulfonate | 50 | 8 | 0.5 |
| o-sulfobenzoic cycloanhydride | 50 | | |
| 5. o-sulfobenzoic cycloanhydride | 80 | 8 | 0.5 |
| benzene boromic acid | 300 | | |

The long term stability of these adhesives was tested by storing samples of the stabilized, accelerated product in an oven heated to 50° C. The change of viscosity as a measure for the stability is plotted in FIG. 1. After 20 days of accelerated ageing the stabilized α-cyanoacrylate-based adhesives according to the invention only exhibited a slight viscosity increase and save short setting times on various substrates before and also after accelerated ageing.

What we claim is:

1. An alpha-cyanoacrylate composition containing as stabilizer a stabilizing amount of one or more sulfonic acid derivatives of the formula:

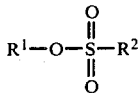

(I)

in which R¹ stands for a trimethylsilyl group Si(CH₃)₃, R² is a halogen atom, a straight or branched-chain alkyl group having 1 to 10 carbon atoms, a perfluoroalkyl group having 1 to 10 carbon atoms, a phenyl group or a tolyl group.

2. A composition according to claim 1 which additionally contains as a co-stabilizer one or more sulfonic acid derivatives of the formula:

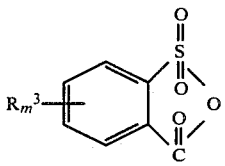

(II A)

wherein R³ is an alkyl group having 1 to 4 carbon atoms, an alkoxy group having 1 to 7 carbon atoms or a nitro group and M has a value of 0, 1, 2 or 3.

3. A composition according to claim 1 which additionally contains as a co-stabilizer one or more sulfonic acid derivatives of the formula:

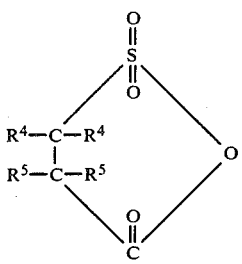

(II B)

wherein R⁴ and R⁵ can be the same or different and stand for hydrogen or alkyl radicals.

4. A composition according to claim 1 which additionally contains as a co-stabilizer one or more (dihydroxy)-organylborane or bis(dihydroxyboryl) derivatives of the formula:

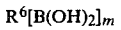

R⁶[B(OH)₂]ₘ    (III)

in which m is 1 or 2 and R⁶ is a straight or branched-chain alkyl or alkylene group having 1 to 12 carbon atoms, which can be substituted by halogen atoms, or R⁶ is a cyclohexyl or cyclohexylene group, an aralkyl or aralkylene group containing from 7 to 9 carbon atoms or a phenyl or phenylene group.

5. A composition according to claim 2 which additionally contains as a co-stabilizer one or more (dihydroxy)-organylborane or bis(dihydroxyboryl) derivatives of the formula:

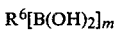

R⁶[B(OH)₂]ₘ    (III)

in which m is 1 or 2 and R⁶ is a straight or branched-chain alkyl or alkylene group having 1 to 12 carbon atoms, which can be substituted by halogen atoms, or R⁶ is a cyclohexyl or cyclohexylene group, an aralkyl or aralkylene group containing from 7 to 9 carbon atoms or a phenyl or phenylene group.

6. A composition according to claim 3 which additionally contains as a co-stabilizer one or more (dihydroxy)-organylborane or bis(dihydroxyboryl) derivatives of the formula:

 (III)

in which m is 1 or 2 and $R^6$ is a straight or branched-chain alkyl or alkylene group having 1 to 12 carbon atoms, which can be substituted by halogen atoms, or $R^6$ is a cyclohexyl or cyclohexylene group, an aralkyl or aralkylene group containing from 7 to 9 carbon atoms or a phenyl or phenylene group.

7. An alpha-cyanoacrylate composition comprising as stabilizer a stabilizing amount of one or more of the following compounds:

(A) sulfonic acid derivatives of the formula:

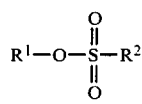 (I)

in which $R^1$ stands for a trimethylsilyl group Si(CH$_3$)$_3$, $R^2$ is a halogen atom, a straight or branched-chain alkyl group having 1 to 10 carbon atoms, a perfluoroalkyl group having 1 to 10 carbon atoms, a phenyl group or a tolyl group or $R^1$ and $R^2$ together, accompanied by cyclization, stand for a group of the formula:

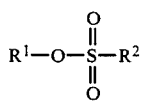 (I)

in which Z is bonded directly to sulfur and is an aromatic radical of the formula:

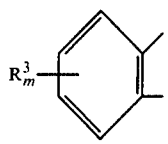

wherein $R^3$ is an alkyl group having 1 to 4 carbon atoms, an alkoxy group having 1 to 7 carbon atoms or a nitro group and m has a value of 0, 1, 2, or 3, or Z is an aliphatic radical of the formula —CR$_2^4$—CR$_2^5$— wherein $R^4$ and $R^5$ can be the same or different and stand for hydrogen or alkyl radicals; and one or more of the following compounds:

(B) (dihydroxy)-organylboranes and bis(dihydroxyboryl)-derivatives of the formula:

 (III)

in which m is 1 to 2, $R^6$ is a straight or branched-chain alkyl or alkylene group having 1 to 12 carbon atoms, which can be substituted by halogen atoms, or $R^6$ is a cyclohexyl or cyclohexylene group, an aralkyl or aralkylene group containing from 7 to 9 carbon atoms or a phenyl or phenylene group.

8. A composition according to claim 7 comprising as stabilizer (i) a (dihydroxy)-organylborane or bis(dihydroxyboryl) derivatives of the formula III; and (ii) as sulfonic acid derivative having the group of the formula II wherein Z in the aliphatic radical designated in claim 7.

9. A composition according to claim 7 comprising as stabilizer (i) a (dihydroxy)-organylborane or bis(dihydroxyboryl) derivative of the formula III; and (ii) a sulfonic acid derivative having the group of the formula II wherein Z is the aromatic radical designated in claim 7.

* * * * *